May 21, 1940.　　　R. H. MITCHELL　　　2,201,240
OFFSET DISK HARROW
Filed Nov. 7, 1938　　　6 Sheets-Sheet 1

INVENTOR.
Rollie H. Mitchell
BY
ATTORNEYS

May 21, 1940.  R. H. MITCHELL  2,201,240
OFFSET DISK HARROW
Filed Nov. 7, 1938  6 Sheets-Sheet 4

INVENTOR.
Rollie H. Mitchell
BY
ATTORNEYS

May 21, 1940.    R. H. MITCHELL    2,201,240
OFFSET DISK HARROW
Filed Nov. 7, 1938    6 Sheets-Sheet 6

INVENTOR.
Rollie H. Mitchell
ATTORNEYS

Patented May 21, 1940

2,201,240

UNITED STATES PATENT OFFICE 2,201,240

OFFSET DISK HARROW

Rollie H. Mitchell, Huntington Park, Calif., assignor to Killefer Manufacturing Corporation, Los Angeles, Calif., a corporation of California Application November 7, 1938, Serial No. 239,200

20 Claims. (Cl. 55—83)

This application is a continuation in part of a co-pending application filed by Oscar W. Sjogren, Edwin F. Wadelton, and myself, on May 5, 1936, Serial No. 77,974, now issued as Patent No. 2,169,471, dated August 15, 1939, and is particularly concerned with the angling control mechanism of an offset tandem disk harrow.

One of the main objects of the co-pending application was the provision of means for setting the working angle of the gangs at any predetermined value together with control mechanism which automatically unlocks the gangs from the working angle whenever the tractor is turned toward that side of the harrow at which the gangs are spread apart, to allow the gangs to be swung out of angle while turning, and which automatically relocks the gangs in the same pre-determined working angle after the tractor is straightened out of the turn.

In most of the embodiments shown in the copending application, the gangs were locked together by latching mechanism, which was unlocked by means of a chain connected to the tractor in offset relation to the main draft connection, while a continued pull on the chain incidental to the change of position of the tractor relative to the harrow while turning, caused the gangs to swing out of working angle. In one other embodiment, which is made the subject of the present application, the offset chain connection is fixed directly to one of the gangs and serves the purpose of pulling the gangs out of working angle, while the gangs are unlatched responsive to a compressive force against the main or primary hitch when the tractor is turned, setting up a force couple in the main hitch and the offset connection.

The principal object of the present invention, therefore, relates to the provision of angling control means responsive to a rearward thrust against the main hitch for unlocking the gangs from normal working position.

More specific objects of this invention relate to the provision of latch mechanisms which are applicable to harrows arranged with the angling control bar on the left side of the implement as well as to harrows in which the bar is located on the right side of the implement.

I will now describe the construction and explain the manner of operation of specific embodiments of my invention, reference being made to the drawings appended hereto and made a part of this application, in which Figure 1 is a plan view of a harrow illustrating one embodiment of my invention, the harrow being shown with the gangs in parallel or transport position;

Figures 1, 2:
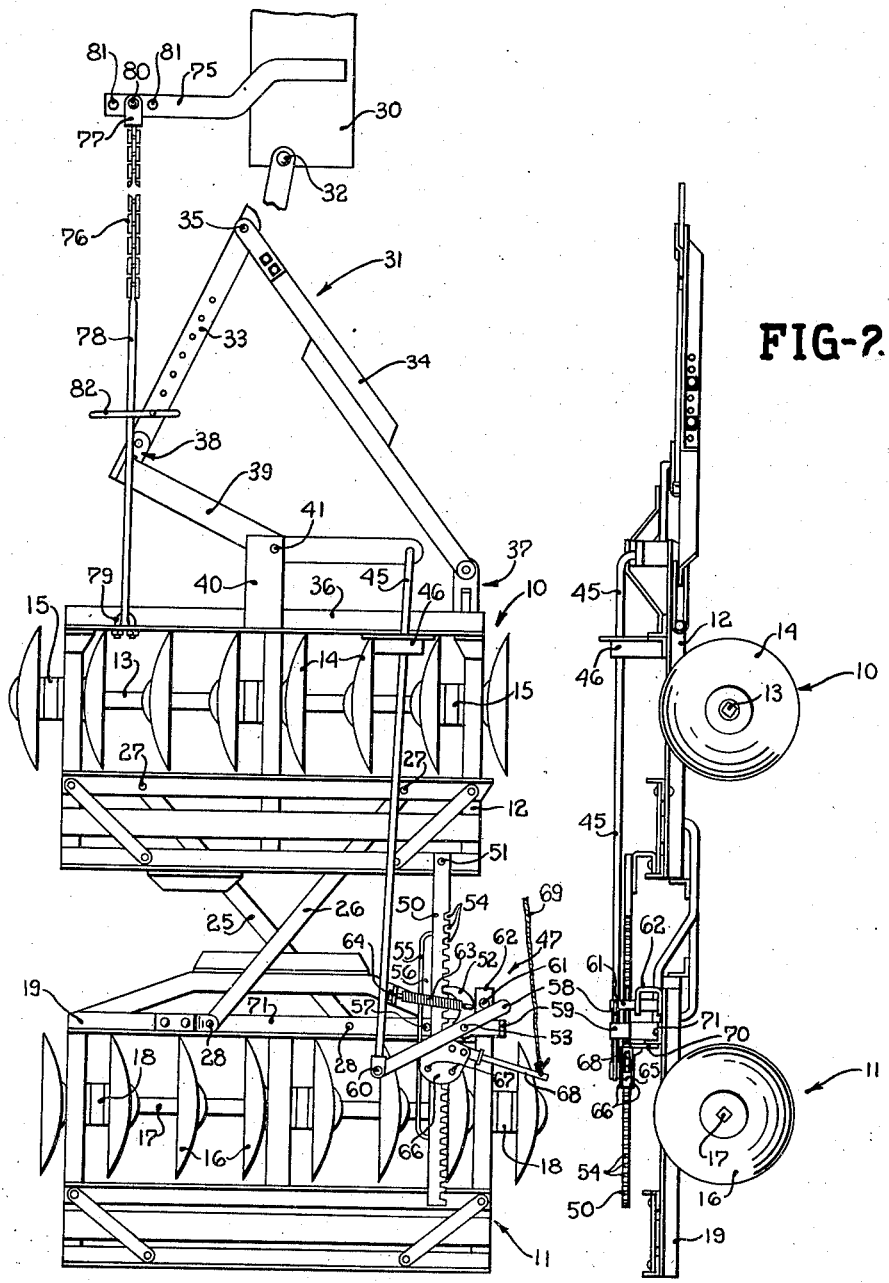
Figure 2 is a side elevation of the harrow shown in Figure 1.

Referring now more particularly to Figures 1-4, the harrow comprises a front disk gang 10 and a rear disk gang 11. The front gang includes a structural frame 12 on which is mounted a gang bolt 13 carrying a plurality of disks 14, the gang bolt being journaled in bearings 15 fixed to the frame 12. The rear gang 11 includes a plurality of disks 16 mounted on a gang bolt 17 which is journaled in bearings 18 on the structural frame 19. The gangs are swingably connected together by a pair of crossed links 25, 26 which are pivoted at their forward ends to the front gang frame 12 by means of pivots 27, and their rear ends are pivoted on pivots 28 to the rear gang frame 19.

The harrow is drawn by a tractor or other draft means, the drawbar of which is indicated at 30. A hitch, indicated generally by the reference numeral 31, is pivoted at its front end by means of a pivot bolt 32 to the drawbar 30 and comprises a pair of generally fore and aft extending draft bars 33, 34 pivotally connected together by a bolt 35 adjacent their forward ends. One of the draft bars 34 is pivotally connected to the front frame bar 36 of the forward gang 10 by means of a universal joint connection 37 providing for both lateral and vertical swinging movement of the drawbar relative to the harrow gang. The other draft bar 33 is pivotally connected by means of a universal joint connection 38 to a transversely extending hitch bar 39 which is pivoted at a point intermediate its ends to a forwardly extending support 40 on the forward frame member 36 by means of a bolt 41. The draft bar 33 is connected to the transverse hitch bar 39 at the end of the latter which is at the side of the harrow opposite to the pivotal connection 37 of the other draft bar 34. The free end of the transverse hitch bar 39 is swingably connected to a fore and aft extending angling control bar 45. The angling control bar extends through a guide 46 and is connected to the rear gang 11 through latch mechanism indicated generally by the reference numeral 47.

The latch mechanism 47 which locks the gangs in angled position during normal ground working operation, comprises a rack bar 50 pivotally connected by a bolt 51 to the right-hand rear corner of the frame 12 of the front gang 10 and extends rearwardly therefrom. The rack bar is engaged by a ratchet dog 52 which is pivoted on the rear gang frame 19 on a bolt 53 and engages a series of notches 54 in the rack bar. The ratchet dog 52 is so shaped that it prevents rearward movement of the rack bar 50 when in engagement therewith, but permits movement of the rack bar forwardly by ratcheting over the notches during such forward movement. The rack bar is maintained in position for engagement with the dog 52 by means of a rod 55 fixed to the rack bar and extending parallel therewith to provide a slot 56 therebetween. A pin 57 fixed to the rear gang frame 19 is disposed within the slot 56 and prevents the rack bar 50 from swinging away from the dog 52. The ratchet dog 52 is disengaged from the rack bar 50 by means of a release lever 58 pivoted intermediate its ends on the pivot bolt 53. The right-hand end of the release lever 58 is adapted to engage the crank arm 59 fixed to the dog 52, when the release lever 58 is moved in a clockwise direction, as viewed in Figure 1. The opposite end of the release lever is connected by a pivot bolt 60 to the rear end of the angling control bar 45.

Thus when the tractor moves forwardly, draft is applied to the draft bars 33 and 34 of the hitch 31, exerting a forward pull through the universal connection 37 on the right-hand front corner of the forward gang frame and through the transverse hitch bar 39 to the forwardly extending support 40, which tends to rotate the transverse hitch bar 39 in clockwise direction. This results in a rearward thrust against the angling control bar 45, thereby tending to rotate the release bar 58 in a counter-clockwise direction, but which is prevented by stop 61 fixed to the frame 19 of the rear gang and held rigidly in a vertical position by a U-shaped support 62. Hence, as the harrow is drawn forwardly, the draft force causes the release bar 58 to bear against the stop 61 and the ratchet dog 52 is held in engagement with one of the notches 54 by means of a tension spring 63, connected between the ratchet dog and a lug 64, fixed on the frame 19. The rearwardly acting thrust in the bar 45 is exerted against the rear gang frame through the release lever 58, tending to force the right-hand end of the rear gang rearwardly and which, in conjunction with forwardly acting force against the right-hand end of the forward gang, causes the gangs to spread apart into the angled position shown in Figure 3, which spreading action, as has been heretofore explained, is not resisted by the ratchet dog 52.

Figure 3:
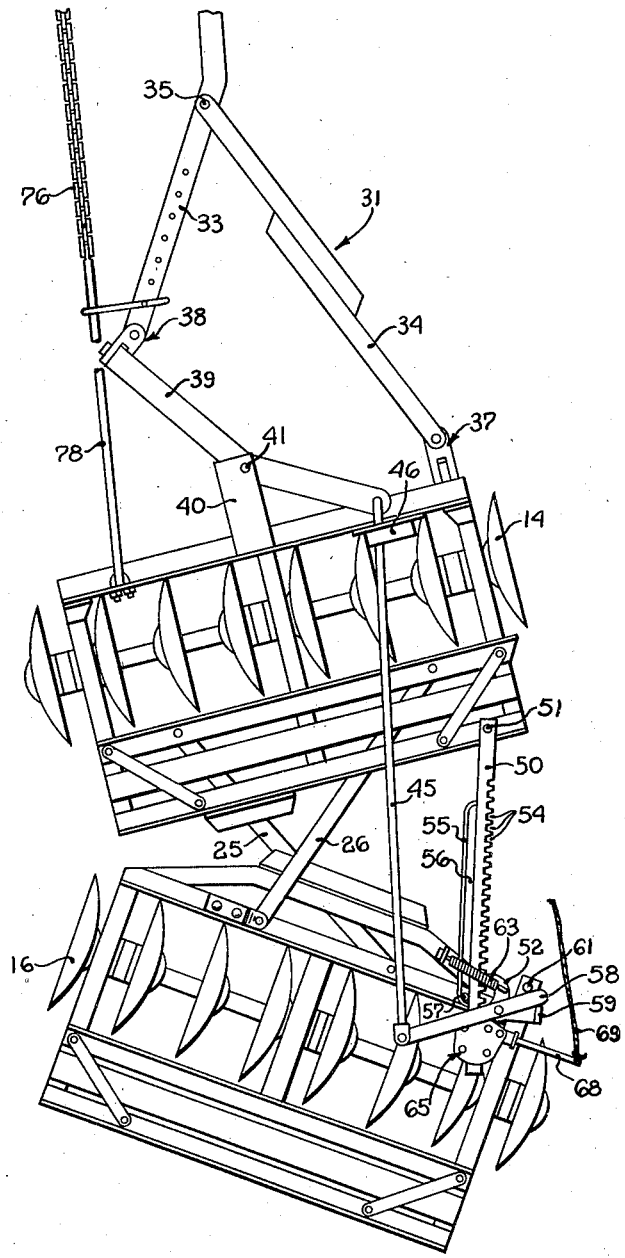
Figure 3 is a plan view of the harrow shown in one of its normal working positions.

The angle to which the gangs are spread apart is limited by means of a stop member 65 which is mounted on the rack bar 50 and slidable therealong. The details of this stop member are fully disclosed in the above-mentioned co-pending application and it is therefore not deemed necessary to repeat them fully here. Briefly, the member comprises upper and lower plates 66 disposed on opposite sides of the rack bar 50 and interconnected by bolts 67 on which are journaled rollers (not shown) which cooperate with the edges of the rack bar to facilitate sliding the stop member 65 therealong. The latch dog (not shown) normally engages one of the notches 54 of the rack bar to lock the stop member 65 in fixed position on the bar, but is releasable by means of a release lever 68 which is manually operated from the tractor seat by means of a rope 69. To set the gangs in any desired working angle, the operator drives the tractor forwardly while he exerts a pull on the rope 69. As draft force is applied through the hitch connections, the gangs are spread apart in a manner heretofore described, causing the rack bar 50 to be pulled forwardly as the ratchet dog 52 ratchets over the notches 54. The stop member 65 is prevented from moving forwardly by virtue of its engagement with an upwardly extending abutment 70 fixed to the transverse frame member 71 of the rear gang. When the harrow has been spread apart to the desired angle, the operator releases the rope 69, locking the stop member 65 to the rack bar 50, causing the stop member to bear against the stop 70 to prevent any further angling movement. In Figure 3 the harrow is shown in its maximum working angle, which is locked in both directions by the stop member 65 and the ratchet dog 52.

Figure 4:
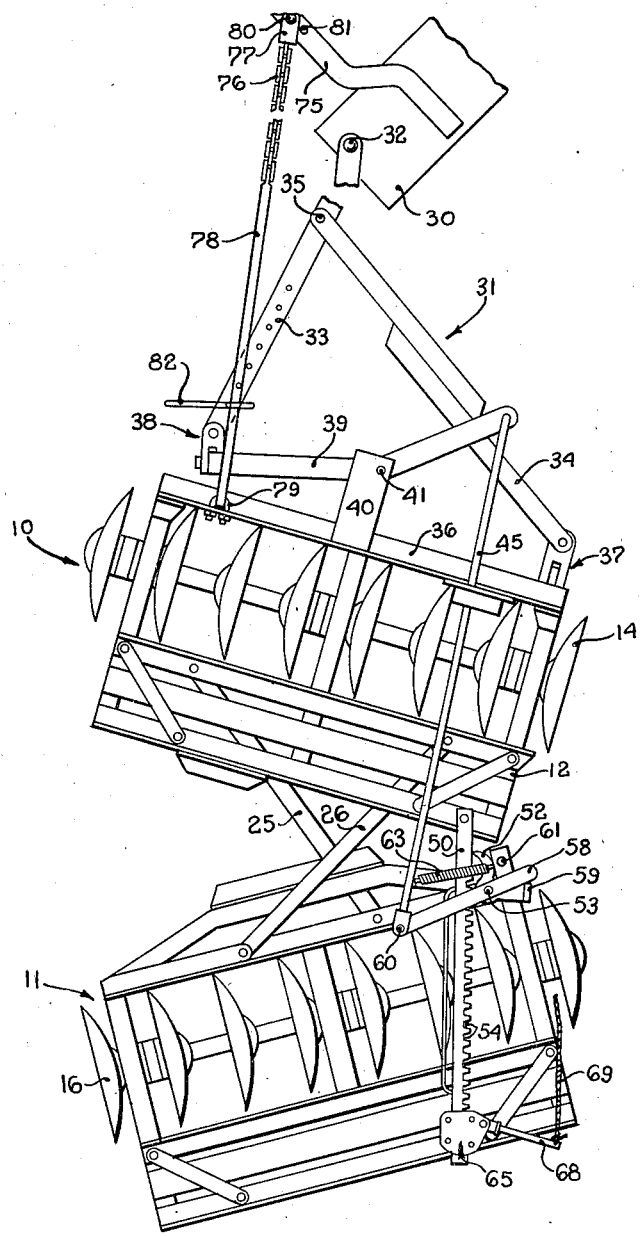
Figure 4 is a plan view of the harrow with the parts shown in the positions assumed while making a right turn.
Figure 5:
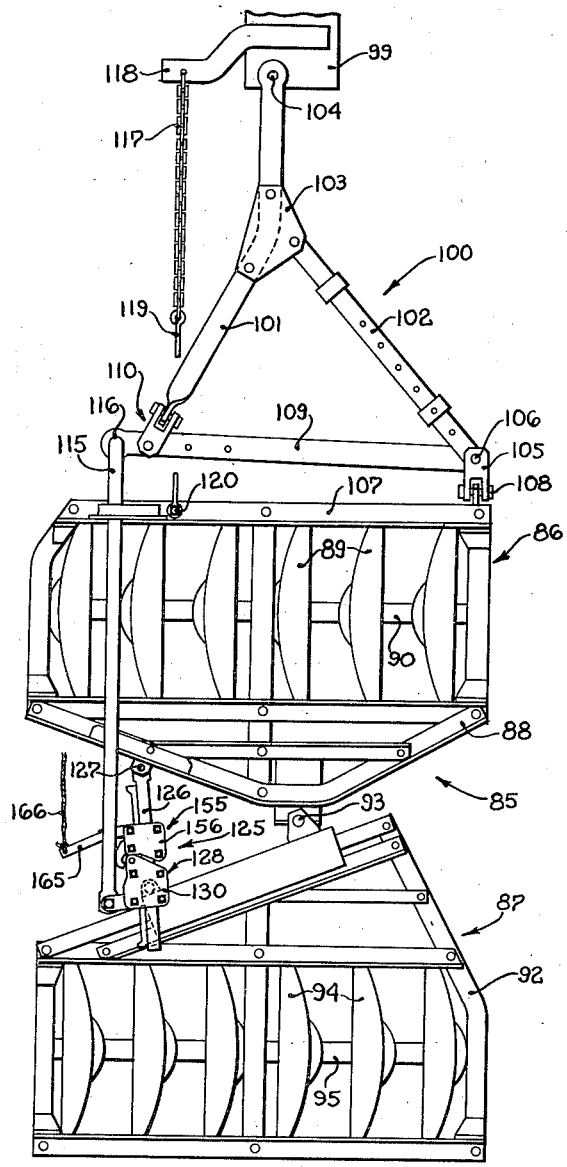
Figure 5 is a plan view of a second embodiment of my invention, showing a harrow in transport position.
Figure 6:
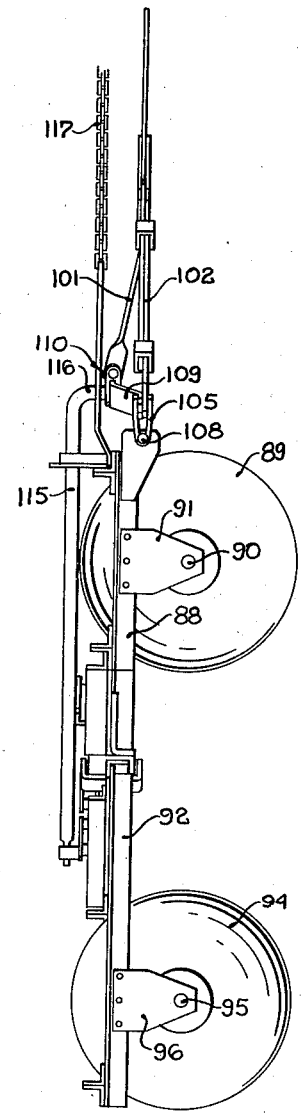
Figure 6 is a side elevation of the harrow illustrated in Figure 5.

When the tractor makes a left turn from this position, no difficulty is encountered since the gang pivots are disposed on axes which are radial to a point located at some distance to the left of the harrow. In order to permit the harrow to be turned to the right, however, it is desirable to move the gangs out of the angled position and angle them in the opposite direction, as shown in Figure 4. To this end a laterally extending arm 75 is rigidly fixed on the drawbar 30 of the draft means and extends opposite to the side of the harrow at which the gangs are angled apart. The outer end of the arm 75 is connected to the left-hand side of the front frame member 36 of the forward gang by means of a secondary draft member comprising a chain 76 fixed to the arm by a clevis 77 at its forward end and to a rod 78 at its rear end, the rod being connected to the angle member 36 by means of a U-bolt 79. The clevis 77 is fixed to the arm 75 by a bolt 80 which is adjustably inserted in one of several apertures 81 in the arm 75. The rod 78 is held in a guide 82 fixed to the draft bar 33, permitting a limited amount of lateral swinging movement of the rod. The chain 76 is normally slack during operation, but when the tractor is turned to the right, as shown in Figure 4, the fixed arm 75 is moved forwardly relative to the harrow, thereby tightening the chain and exerting a pull on the left-hand side of the front gang. This forward pull on the chain sets up a compression force in the primary hitch bar 33, causing the transverse hitch bar 39 to be moved in a counter-clockwise direction and thereby pulling forwardly on the angling control bar 45. Thus the release lever 58 is swung in a clockwise direction about the pivot bolt 53 and engages the crank arm 59, causing the ratchet dog 52 to be swung out of engagement with the rack bar 50. A continued forward pull on the angling control bar 45 incidental to the turning of the tractor, causes the right-hand end of the rear gang to be drawn forwardly after the ratchet dog has been released and the compressive force against the hitch bar 33 tends to force the right-hand end of the front gang rearwardly, thereby moving the gangs out of their working angle and angling them in the opposite direction, as shown in Figure 4, thus facilitating a right-hand turn.

As soon as the tractor is straightened out of the turn, the tension in the chain 76 is released because of the arm 75 moving back to its normal position. This restores the forwardly acting draft pull in the hitch which acts through the transverse hitch bar 39 to force the angling control bar 45 rearwardly, causing the rear gang to swing back to its normal working position. It will be noted that during the right turn, the stop member 65 remains locked in its adjusted position on the rack bar so that as the gangs swing back into working angle, they automatically reassume the pre-determined angled position when the stop member 65 once more engages the stop 70 on the rear gang frame.

To return the gangs from working position to transport position, the operator backs the tractor, pushing the right end of the front gang rearwardly while the transverse hitch bar 39 is swung in a counter-clockwise direction, pulling the right end of the rear gang forwardly. After the gangs are parallel, the operator pulls the stop member 65 forwardly along the rack bar by pulling on the rope 69, until the stop 65 is in abutment with the stop 70. The harrow can now be drawn forwardly, the gangs being locked in parallel position.

It is to be understood that, although, for purposes of continuity, I have shown the latching mechanism 47 constructed according to the teachings of the above-mentioned co-pending application, I do not intend my invention to be limited to these precise details. In fact, the construction which I now prefer, will be described in detail in connection with the other embodiment of my invention, illustrated in Figures 5–9.

Referring now more particularly to Figures 5–9, the harrow of this embodiment, indicated generally by reference numeral 85, comprises a front gang 86 and a rear gang 87 disposed in tandem relation. The front gang 86 comprises a frame 88 on which is supported a plurality of disks 89 mounted on a gang bolt 90, which is journaled in suitable bearings 91 fixed to the frame 88. The rear gang 87 has a rigid frame 92 which is connected for horizontal angling movement to the front gang frame 88 by means of a vertically disposed pivot pin 93. The disks 94 of the rear gang are also supported in spaced relation on a gang bolt 95, which is journaled in suitable bearings 96 mounted on the frame 92.

Figure 7:
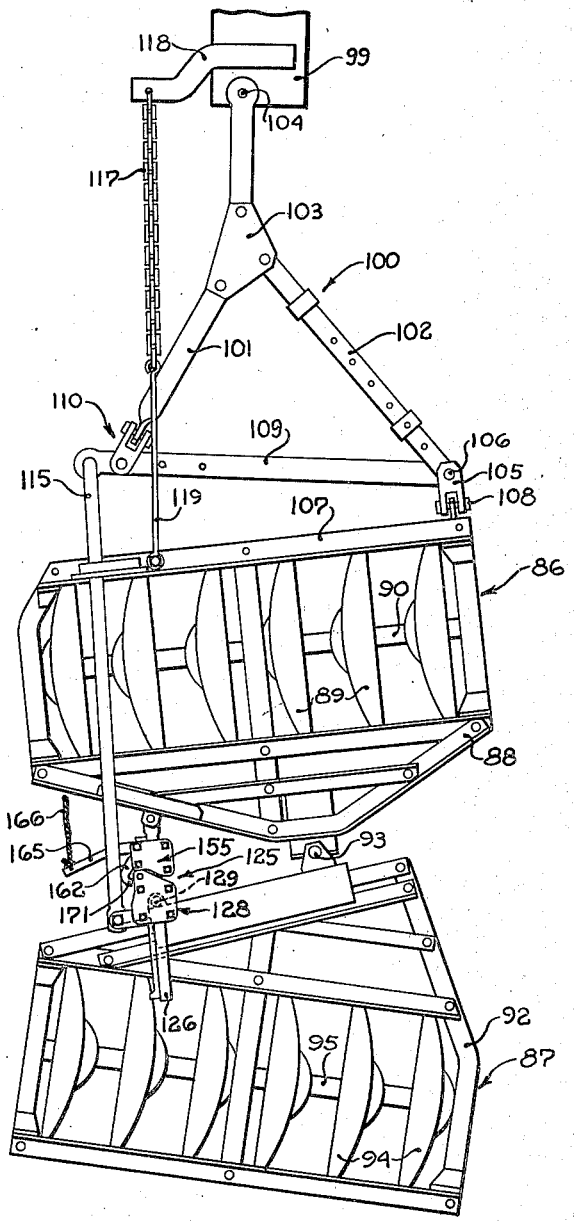
Figure 7 is a plan view of the harrow shown in one of its normal working positions.
Figure 8:
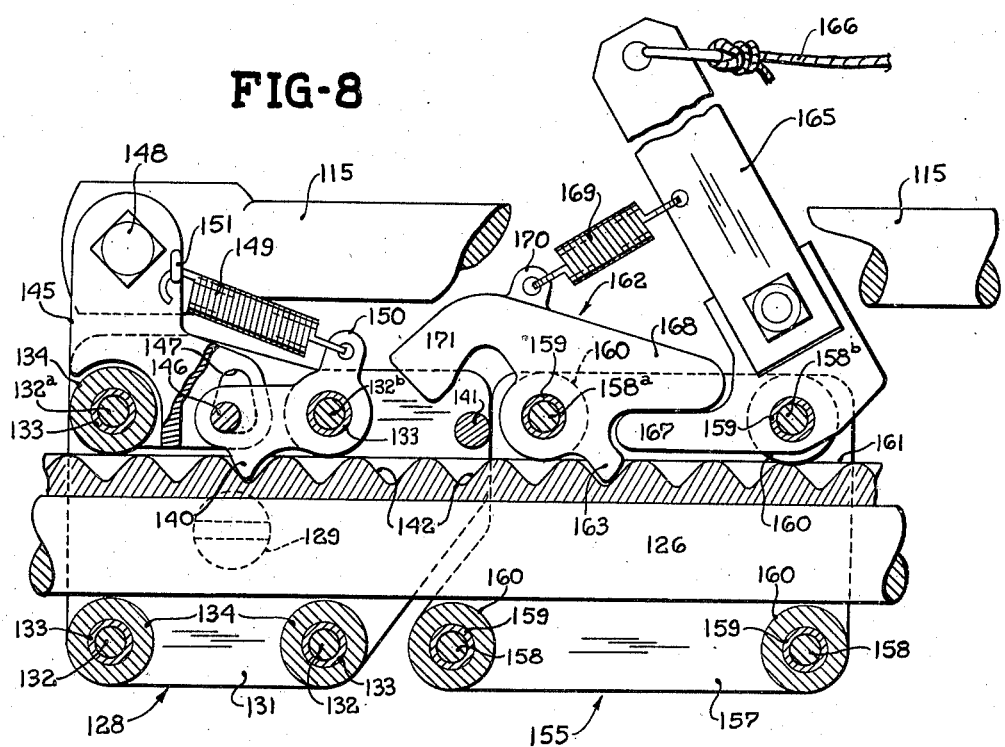
Figure 8 is a detail plan view partly in section of the latch mechanism with its parts shown in the position assumed when the harrow is in normal working position.
Figure 9:
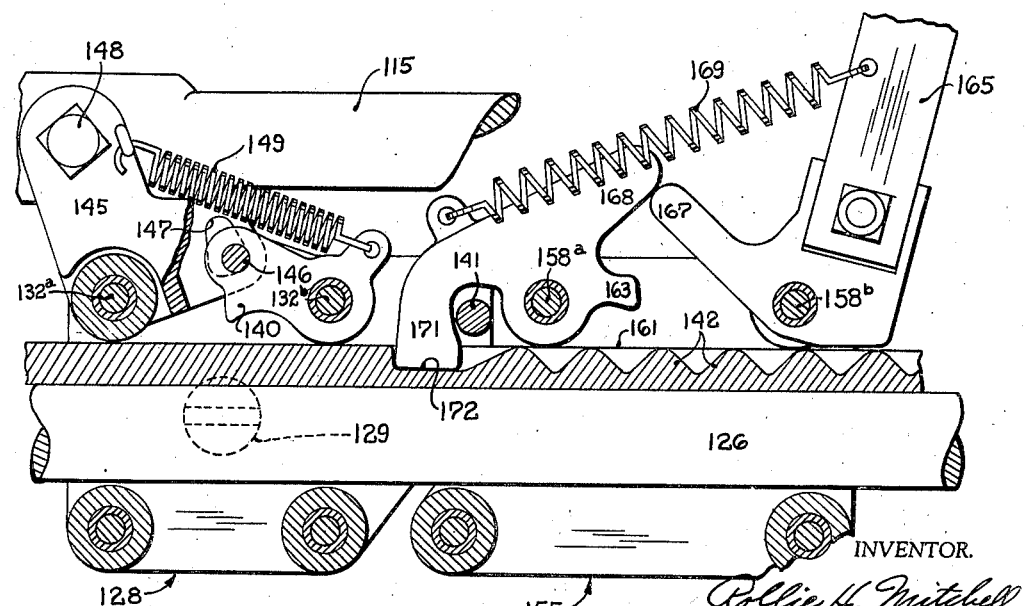
Figure 9 is a view similar to Figure 8 but with the parts in the position assumed as the harrow is backed from working position into transport position.

The harrow is connected to a draft device 99, such as a tractor, by means of a hitch 100 comprising a pair of forwardly converging draft bars 101, 102. One of the bars 102 is pivotally connected to a plate 103, which is fixedly secured to the other draft bar 101, the latter extending forwardly to a pivot connection 104 in the draft device 99. The draft bar 102 is extensible in a manner well known to those skilled in the art for the purpose of adjusting the amount of offset of the harrow. The rear end of the right-hand draft bar 102 is connected to a universal joint member 105 by a vertical pivot bolt 106, and the universal joint member 105 is connected to the front frame bar 107 for pivotal movement about a horizontal pivot bolt 108. The rear ends of the draft bars 101, 102 are interconnected by a transversely extending hitch bar 109 which is connected at the right end to the vertical pivot bolt 106 and at its left end to the rear end of the draft bar 101 by means of a universal joint 110. Thus the hitch 100 swings as a unit about the vertical pivot 106 relative to the front gang 86, transmitting draft force to the right front corner of the frame 88 of the front gang and also to the left end of the rear gang frame 92 by means of an angling control bar 115 extending longitudinally from the free end of the transverse hitch bar 109 across the top of the front gang to a connection with the rear gang which will be described in detail later. The forward end of the angling control bar has a downwardly turned portion 116 which extends through a hole in the end of the transverse bar 109. By applying draft force to the right end of the front gang and to the left end of the rear gang, as explained above, the gangs are pulled into angled position, as shown in Figure 7, with the gangs diverging toward the right.

The draft means 99 is connected to the left end of the front gang frame by a secondary hitch connection comprising a chain 117 connected at its forward end to an arm 118 fixed to the draft device 99 and extending laterally toward the left in offset relation to the primary hitch pivot 104. The rear end of the chain 117 is connected through a rod 119 and a bolt 120 to the front frame bar 107. The chain 117 is normally slack when the tractor is drawing the harrow in a straight line either in the transport position of Figure 5 or the angled position of Figure 7, but when the tractor makes a right turn, the arm 118 is swung forwardly relative to the primary hitch pivot 104, thereby exerting a pull through the chain on the left end of the front gang and setting up a compressive force in the primary hitch 100 which pushes rearwardly against the right corner of the front gang and also against the left end of the rear gang through the angling control bar 115.

The gangs are latched in predetermined working angle by latch mechanism indicated generally by reference numeral 125 which will now be described. A longitudinally extending rack bar 126 is connected to the rear of the front gang frame 88 by a vertically disposed pivot bolt 127 and extends rearwardly through a latch cage 128 which is mounted on the rear gang frame 92 and pivotally connected thereto by a vertically disposed pivot bolt 129. The latch cage comprises a pair of upper and lower plates 130, 131 secured in parallel spaced relation by four bolts 132 and spacing collars 133 thereon. The rack bar 126 is slidable longitudinally in the cage 128 and is guided by rollers 134 rotatably mounted on the bolts 132 at opposite sides of the rack bar.

The rack bar 126 is engaged by a ratchet dog 140 which is pivotally connected between the upper and lower plates 130, 131 of the cage 128 by means of the bolt 132b. The dog 140 engages the teeth 142 of the rack bar 126 in such manner that the rack bar is prevented from moving forwardly relative to the cage 128 when the dog is in engagement but is free to move rearwardly by virtue of the shape of the dog 140 which permits it to ratchet over the teeth of the rack bar when the latter moves rearwardly. Thus the ratchet dog 140 permits the left sides of the gangs to be closed together into angled position as the draft force is applied, as explained heretofore, but prevents the gangs from swinging out of working position as long as the dog is in engagement with the rack bar 126.

The ratchet dog is disengaged from the rack bar teeth 142 by means of a release lever 145 in the form of a bell crank pivoted on the bolt 132a. The release lever is connected to the ratchet dog 140 by means of a pin 146 fixed to the head of the ratchet dog and extending through an enlarged aperture 147 in the lever 145. This enlarged aperture provides lost motion in the connection which permits the dog to ratchet over the teeth 142 of the rack bar without moving the lever 145, but the dog 140 can be swung out of engagement with the rack bar by rotating the release lever 145 in counter-clockwise direction, to the released position shown in Figure 9. The other crank arm of the release lever 145 is pivotally connected to the rear end of the angling control bar 115 by a pivot bolt 148. It is evident in Figure 9 that a rearward thrust on the angling control bar 115 incidental to making a right turn as heretofore described, causes the release arm 145 to swing in a counter-clockwise direction, thereby releasing the dog from engagement with the rack bar. A spring 149 connected between a lug 150 on the ratchet dog and a lug 151 on the release lever, normally holds the dog in engagement with the rack bar during forward movement of the harrow in a straight line.

The angle to which the gangs swing as the harrow moves forwardly, is limited by means of a stop member 155 which is slidable along the rack bar 126 and comprises a cage including upper and lower plates 156, 157 secured together by bolts 158 on opposite sides of the rack bar and spaced apart by spacing washers 159. Rollers 160 are rotatable on the spacing washers 159 and engage tracks 161 on opposite sides of the rack teeth 142 to facilitate sliding the stop member 155 along the bar 126. The stop cage 155 is latched to the rack bar by means of a latching dog 162 which is pivoted on one of the cage bolts 158a and has an angle selector pawl 163 formed integral therewith, which engages the teeth 142 and is shaped to lock the stop member against forward movement along the bar 126 when the pawl 163 is in engagement point. When the harrow is drawn forwardly, the forward pull on the angling control bar swings the left end of the rear gang forwardly until the latch cage 128 abuts against the stop member 155, thereby preventing further forward movement. Thus when the gangs are in a normal working angle, they are locked against angling movement in one direction by the ratchet dog 140 and in the other direction by the angle selector pawl 163 of the latching dog 162.

The pawl 163 can be moved out of engagement with the teeth 142 by means of a lever 165 which is manually controlled by means of a rope 166. The lever 165 is pivoted on cage bolt 158b and is formed with an arm 167 which engages an arm 168 formed on the latching dog 162. A forward pull on the rope 166 causes a camming action between the arms 167, 168 which swings the latching dog 162 about the pivot bolt 158a and raises the pawl 163 out of engagement. A spring 169 is connected between the lever 165 and a lug 170 on the latching dog 162, tending to hold the latter with the pawl 163 in engagement with the teeth 142.

The latching dog 162 is provided with an integrally formed hook portion 171 which hooks over a lug 141 when the ratchet dog 162 is rotated to disengage the pawl 163. The purpose of this hook is to couple the stop member 155 to the latch cage 128 in order to move the stop member rearwardly with respect to the rack bar 126 when the gangs are straightened out of angle and thereby avoid the necessity for the operator to leave the tractor and push the stop member rearwardly by hand.

The operation of this embodiment of my invention is as follows:

With the gangs in parallel or transport position, the operator pulls on the rope 166 and drives the tractor forwardly to set the gangs in any desired working angle. When the gangs reach the desired angle, the rope 166 is released, whereupon the pawl 163 engages the rack bar to prevent any further angling movement. With the gangs in angled position, as shown in Figure 7, a left turn can be made by the tractor without changing the angle of the gangs, as described heretofore. When the tractor is turned to the right, however, the chain 117 is tightened, as explained above, tending to pull the left end of the front gang forwardly, causing a reactive force to be exerted rearwardly upon the hitch bar 100, which force is transmitted through the angling control bar 115, and swings the release lever 145, thereby disengaging the ratchet dog 140 from the rack bar. After the rack bar is released from the dog 140, the gangs are free to be spread apart out of the angled position by the oppositely acting forces on the chain and hitch device, thus facilitating a right turn. Inasmuch as the latching dog 162 is not actuated during this operation, the stop member 155 remains fixed in position on the rack bar as the latter slides forwardly through the latch cage 128. After the turn is completed the tractor straightens forwardly once more and releases the pull on the chain 117, causing the gangs to be angled toward their predetermined working position. The forward pull on the angling control bar 115 pulls the left end of the rear gang forwardly until the cage 128 abuts against the stop member 155 once more.

The gangs are returned to parallel relation by backing the tractor, at the same time exerting a pull on the rope 166. The tractor pushes rearwardly through the angling control bar 115, releasing the ratchet dog 140 from the rack bar and swinging the rear gang to a position parallel with the front gang. This operation is accompanied by a backward push on the right end of the front gang through the draft bar 102. The latching dog 162 is held by the lever 165 in a position with the hook portion 171 in engagement with the lug 141 and as the rack bar is drawn forwardly through the latch cage 128 and the stop member 155, the end of the hook portion 171 ratchets over the ends of the teeth 142. As the gangs reach the transport position shown in Figure 5, the end of the hook portion 171 drops into a notch 172 at the end of the row of teeth 142 and thereby interrupts the angling movement of the two gangs. At this moment the parts are in the relative positions shown in Figure 9. The lever 165 is then released, allowing the pawl 163 to drop into engagement with the teeth 142 once more, locking the gangs in parallel relation, after which the harrow can be drawn forwardly in transport position.

In the two embodiments described herein, I have disclosed an angling control mechanism controlled manually and automatically by a force exerted through the angling control bar, and have shown that this invention can be applied to offset harrows in which the angling control bar is on either the right or the left side of the harrow. However, I do not intend my invention to be limited to the specific details shown and described in this application except as limited by the following claims:

1. An implement of the class described comprising a front gang, a rear gang, means connecting said gangs together providing for horizontal angling movement, a primary hitch member pivotally connected to said front gang and swingable relative thereto, draft means pivotally connected to said hitch member, a secondary hitch member connected to said draft means in offset relation to said primary hitch member and to one of said gangs, an angling control bar connected to said primary hitch member at a point offset from its pivotal connection with said front gang, latch means interconnecting said gangs for determining the operating angle therebetween, an actuating member for unlocking said latch means, and means connecting said angling control bar with said actuating member, to unlock said latch when the implement is drawn around a turn in one direction to permit the gangs to swing out of said operating angle.

2. An implement of the class described comprising a front gang, a rear gang, means connecting said gangs together providing for horizontal angling movement, latch means for locking said gangs together in a predetermined operating angle, a draft means, a primary hitch device swingably connected to said front gang and to said draft means, a secondary draft member connected to said draft means in offset relation to said hitch device, an angling control member connected to said hitch device at a point spaced laterally from the point of connection of the latter with said front gang, means connecting one of said members with one of said gangs, and means connecting the other of said members through said latch means to the other of said gangs and adapted to unlock said latch means responsive to oppositely acting forces set up in said members coincidentally with a turning of the implement.

3. An implement of the class described comprising a front gang, a rear gang, means connecting said gangs together for horizontal angling movement, a hitch device swingably connected to the front gang, an angling control member connected to said hitch device and extending rearwardly therefrom, a latch member swingably connected to said rear gang, a cooperative latch member connected to said front gang and adapted to engage said swingable latch member in several positions of angular adjustment of said implement, and means connecting said angling control member to said swingable latch member to release said latch members upon a reversal of draft force applied to said angling control member.

4. An implement of the class described comprising a front gang, a rear gang, means connecting said gangs together for horizontal angling movement, a hitch device swingably connected to the front gang, an angling control member connected to said hitch device and extending rearwardly therefrom, a locking dog pivotally mounted on said rear gang, a rack bar connected to said front gang and engageable with said locking dog, and an actuating member interconnecting said angling control member and said rear gang and movable relative to the latter to unlock said dog from said rack bar.

5. An implement of the class described comprising a front gang, a rear gang, means connecting said gangs together for horizontal angling movement, a hitch device swingably connected to the front gang, an angling control member connected to said hitch device and extending rearwardly therefrom, a locking dog pivotally mounted on said rear gang, a rack bar connected to said front gang and cooperative with said locking dog to lock said gangs against angling movement in one direction but permitting angling movement in the opposite direction, manually operated means for optionally limiting the angling movement in said opposite direction to one of several different positions of angular adjustment, and means interconnecting said angling control member and said rear gang and movable relative to the latter to provide for unlocking said locking dog and then moving said gangs in said one direction of angling movement by force exerted through said angling control member.

6. An implement of the class described comprising a front gang, a rear gang, means connecting said gangs together for horizontal angling movement, a hitch device swingably connected to the front gang, an angling control member connected to said hitch device and extending rearwardly therefrom, a rack bar connected to said front gang, a locking dog pivotally mounted on said rear gang and normally disposed in engagement with said rack bar, a lever pivoted on said rear gang and adapted to engage said locking dog for disengaging the latter from said rack bar, and means connecting said rearwardly extending angling control member to said lever for unlocking said dog responsive to longitudinal movement of said angling control member in one direction.

7. An implement of the class described comprising a front gang, a rear gang, means connecting said gangs together for horizontal angling movement, a hitch device swingably connected to the front gang, an angling control member connected to said hitch device and extending rearwardly therefrom, a rack bar connected to said front gang, a locking dog pivotally mounted on said rear gang and normally disposed in engagement with said rack bar, a lever pivoted on said rear gang and adapted to engage said locking dog for disengaging the latter from said rack bar, means connecting the rear end of said angling control member to said lever, draft means connected to said hitch device, and a secondary hitch member connected to said draft means and to said front gang at points spaced laterally from the corresponding points of connection of said hitch device, said lever being adapted to unlock said dog from said rack responsive to a forwardly acting force on said secondary hitch member and a rearwardly acting force against said angling control member, continued application of said forces after disengagement of said dog effecting an angling movement of said gangs out of their angled operating position.

8. An offset disk harrow comprising a front disk gang, a rear disk gang, means connecting said gangs together for horizontal angling movement to and from angled relation, a hitch including a pair of hitch bars connected together at the forward end of the hitch, a draft connection at the forward end of the hitch, means for pivotally connecting one of the hitch bars to the front gang at the side of the harrow at which the gangs are angled apart in normal operating position, a transverse hitch bar, means pivotally connecting one end of the transverse hitch bar to the other of said pair of hitch bars, a pivot connection between the front disk gang and the transverse hitch bar intermediate the ends of the latter, a rod connected to the transverse hitch bar adjacent the opposite end thereof and extending to the rear disk gang, a latch lever mounted on the rear gang and connected to said rod, means including a releasable latch for adjustably holding said gangs apart in different angular operating positions but yielding to angular movement to increase the angle between the gangs, means for adjustably limiting the angular spread of said gangs in operating position, a fixed arm extending transversely from said draft connection, and a connection from said arm to the front disk gang at the side of the latter opposite to the side of the harrow at which the gangs are angled apart, said latch lever being adapted to release said latching means when the harrow is turned toward the side at which the gangs are angled apart, imparting a forwardly acting force upon said front gang through the connection from said arm and a rearwardly acting force through said draft connection upon said hitch means, and thereby causing said gangs to be closed together from said normal operating position.

9. An offset disk harrow comprising a front disk gang, a rear disk gang, means connecting said gangs together for horizontal angling movement to and from angled relation, a hitch member including a transverse hitch bar pivotally connected to the front gang at the side of the harrow at which the gangs are angled apart in normal operating position, an angling control bar connected to the opposite end of said hitch bar, latch means connecting said gangs together for adjustably determining the angle of operation, a release lever pivotally connected with said rear gang and movable to unlock said latch means, and means pivotally connecting said angle control bar to said release lever.

10. An offset disk harrow comprising a front gang, a rear gang, means connecting said gangs together for horizontal angling movement to and from angled relation, a hitch member pivotally connected to the front gang at the side of the harrow at which the gangs are angled apart in normal operating position, an angling control bar connected to said hitch member and disposed along the opposite side of said harrow, latch means connecting said gangs together for adjustably determining the angle of operation, a release lever pivoted on said rear gang for unlocking said latch means, said angle control bar being connected to said release lever for unlocking said latch means responsive to a rearwardly acting force upon said bar, a draft connection for said hitch member, an arm extending laterally from said draft connection, and means connecting said arm with one of said gangs and adapted to act under tension when the harrow is turned in the direction toward the open side of the gang angle, to pull the gangs out of said angled relation, thereby imparting a rearwardly acting force through said draft connection upon said angling control bar to release said latch means.

11. An offset disk harrow comprising a front gang, a rear gang, means connecting said gangs together for horizontal angling movement to and from angled relation, a hitch member pivotally connected to the front gang at the side of the harrow at which the gangs are angled apart in normal operating position, an angling control bar connected to said hitch member and disposed along the opposite side of said harrow, and latch mechanism interconnecting said gangs comprising a rack bar secured to said front gang, a ratchet dog mounted on the rear gang and adapted to coact with said rack bar to hold the gangs against angular movement out of said normal operating position but permitting angular movement in the opposite direction, a release lever mounted on said rear gang for disengaging said dog from said rack bar, said angling control bar being connected to said release lever and operable to disengage said dog responsive to a rearward thrust on said angling control bar, and an adjustable stop on said angling control bar for limiting the extent of angling movement of the gangs to a predetermined operating angle.

12. In a disk harrow comprising a pair of gangs swingably connected together, angle selecting control mechanism comprising a rack bar secured to one of said gangs, a ratchet dog pivoted on the other gang and adapted to coact with said rack bar to prevent angling movement of said gangs in one direction but to permit angling movement in the opposite direction, a stop member slidable along said rack bar for adjustably limiting the angling movement of the gangs in said opposite direction, a release lever pivotally mounted adjacent said ratchet dog for disengaging the latter from said rack bar, and an angling control bar connected to said release lever.

13. In a disk harrow comprising a pair of gangs swingably connected together, angle selecting control mechanism comprising a rack bar secured to one of said gangs, a ratchet dog pivoted on the other gang and adapted to coact with said rack bar to prevent angling movement of said gangs in one direction but to permit angling movement in the opposite direction, a stop member slidable along said rack bar for adjustably limiting the angling movement of the gangs in said opposite direction, a latching dog pivoted on said stop member for latching the latter to said rack bar, manually controlled means for releasing said latching dog, a release lever connected to said ratchet dog, and hitch means connected to one of said gangs and to said release lever for actuating the latter to release said ratchet dog and thereby unlocking said gangs for angling movement.

14. In a disk harrow comprising a pair of gangs swingably connected together, angle selecting control mechanism comprising a rack bar secured to one of said gangs, a ratchet dog pivoted on the other gang and adapted to coact with said rack bar to prevent angling movement of said gangs in one direction but to permit angling movement in the opposite direction, a stop member slidable along said rack bar for adjustably limiting the angling movement of the gangs in said opposite direction, a latching dog pivoted on said stop member for latching the latter to said rack bar, manually controlled means for releasing said latching dog, means controlled by said manually controlled releasing means for locking said stop member to said other gang, a release lever for releasing said ratchet dog, and hitch means connected to one of said gangs and to said release lever for transmitting draft force to actuate the latter during a turn to unlock said gangs for relative angling movement.

15. A disk harrow comprising a front gang, a rear gang, means pivotally connecting said gangs together for horizontal angling movement, a hitch pivoted to said front gang at the side of the harrow at which the gangs are angled apart during normal operation, an angling control bar disposed at the opposite side of the harrow and connected to said hitch and movable fore and aft when the hitch is swung relative to the front gang, a rack bar connected to the front gang, a ratchet dog pivoted to the rear gang and engageable with the rack bar permitting the gangs to be swung apart into angled operating position but preventing angling movement in the opposite direction, a release lever mounted on said rear gang and connected to said angling control bar for releasing said ratchet dog responsive to a rearward thrust on said bar, a stop member slidable on said rack bar and engageable with parts on said rear gang for adjustably limiting the angling movement of said gangs into said angled position, manually releasable latching means engageable with said rack bar for holding said stop member in adjusted position on said bar, and hook means actuated simultaneously with the releasing of said latching means, for attaching said stop member to said rear gang to move coadunatively therewith during adjustment of the operating angular position of the gangs.

16. In a latch mechanism of the class described for adjustably locking a pair of members in different positions relative to each other, a rack bar connected with one of said members, a ratchet dog pivotally connected with the other of said members and engageable with said rack bar to prevent relative movement of said members away from each other, a release lever for disengaging said ratchet dog from said rack bar, a stop member slidable on said rack bar and including a latching dog releasably engageable with said rack bar, a releasing lever mounted on said stop member for disengaging said latching dog from said rack bar, and a hook associated with said stop member and actuated by said last named lever when the latching dog is disengaged, for hooking said stop member to the member connected with said latching dog whereby the stop member is moved along the rack bar as said members are moved apart.

17. In a latch mechanism of the class described for adjustably locking a pair of members in different positions relative to each other, a rack bar connected with one of said members, a ratchet dog pivotally connected with the other of said members and engageable with said rack bar to prevent relative movement of said members away from each other, a release lever for disengaging said ratchet dog from said rack bar, a stop member slidable on said rack bar and including a dog pivoted on said stop member, said dog comprising a latching portion adapted to engage said rack bar and a hook portion adapted to attach to a part carried by the member to which is connected said ratchet dog, said hook portion being engaged therewith when said latching portion is disengaged from said rack bar, and a lever pivoted on said stop member for moving said dog between latched and hooked positions.

18. In a disk harrow comprising a pair of gangs swingably connected together, angle selecting control mechanism comprising a rack bar secured to one of said gangs, a ratchet dog pivoted on the other gang and adapted to coact with said rack bar to prevent angling movement of said gangs in one direction but to permit angling movement in the opposite direction, a stop member slidable along said rack bar for adjustably limiting the angling movement of the gangs in said opposite direction, and an angling control bar connected with said ratchet dog for disengaging the latter from said rack bar.

19. In a disk harrow comprising a pair of gangs swingably connected together, angle selecting control mechanism comprising a rack bar secured to one of said gangs, a ratchet dog pivoted on the other gang and adapted to coact with said rack bar to prevent angling movement of said gangs in one direction but to permit angling movement in the opposite direction, a stop member slidable along said rack bar for adjustably limiting the angling movement of the gangs in said opposite direction, a latching dog pivoted on said stop member for latching the latter to said rack bar, manually controlled means for releasing said latching dog, and draft means connected with said gangs and with said ratchet dog and operative to actuate the latter when the harrow is turned in one direction, to unlock said gangs for angling movement.

20. In a disk harrow comprising a pair of gangs pivotally connected together for horizontal angling movement, angling control mechanism comprising a rack bar secured to one of the gangs, a ratchet dog pivoted on the other gang and adapted to coact with said rack bar to lock the gangs together in angled relation, an angling control bar connected with said ratchet dog, and hitch means connected to said gangs and to said angling control bar to actuate the latter to unlock the gangs when the harrow is turned in one direction.

ROLLIE H. MITCHELL.